Feb. 4, 1964    R. E. DAVIS    3,120,112
ICE MOLD
Filed Nov. 13, 1962

INVENTOR.
ROBERT E. DAVIS
BY
Lloyd M. Keighley
ATTORNEY

United States Patent Office 3,120,112
Patented Feb. 4, 1964

3,120,112
ICE MOLD
Robert E. Davis, Dayton, Ohio, assignor to General Motors Corporation, Detroit, Mich., a corporation of Delaware
Filed Nov. 13, 1962, Ser. No. 236,979
4 Claims. (Cl. 62—369)

This invention relates to refrigeration, particularly to a freezing device or tray for use with refrigerators for harvesting ice pieces frozen in compartments of the tray therefrom.

I am aware that others have previously produced rubber-like resilient distortable devices or trays for receiving and freezing water therein into ice pieces or blocks but to my knowledge these former trays have not been entirely satisfactory for various reasons. A serious objection in the use of such trays is the incapability of harvesting a selected ice piece or several of them from a compartment or compartments of the tray while permitting other ice pieces to remain in their respective compartments so that the tray with the remaining ice pieces therein can be reinserted into a freezing chamber of a refrigerator cabinet. This has been due to the fact that ice pieces or blocks frozen in compartments of certain former trays were of a shape or configuration which prevented them from being individually rotated or shifted out of the compartments by fingers of a person's hand and ice pieces in certain other trays, even if loosened from walls of their compartments and rotated part way out of same would, if not held in a rotated position with respect to the compartments, slip back thereinto before they could be selectively and individually removed from the tray. Prior ice trays were unreasonably difficult of performance and a user in attempting to harvest a few selected ice pieces or blocks therefrom soon gave up such attempt as involving too much time and labor and therefore inadvertently formed a habit of twisting and inverting the tray whereupon all ice pieces or blocks therein would be released therefrom. Continuance of this habit requires the entire tray to be refilled with water when only a few selected ice blocks are needed for immediate use. Obviously such practice wastes many ice blocks and results in the making of the ice blocks within a household refrigerator an expensive proposition. I contemplate an improvement in this art which will overcome objections to former ice trays of the character described, will increase versatility in the use thereof and thereby render them practical.

An object of my invention is to provide an improved freezing device or ice tray structure for use with refrigerator cabinets for readying selected ice pieces frozen in the tray for harvest therefrom which is convenient to carry out and which requires very little physical exertion on the part of the user.

Another object of my invention is to provide within a resilient distortable tray type freezing device a unique arrangement for releasing selected pieces of ice frozen in compartments or pockets thereof therefrom and for supporting or holding a portion of the released ice pieces in an accessible elevated position above the top of the tray for removal thereof independently of other ice pieces therein while the tray is uprighted.

In carrying out the foregoing objects it is a further object of my invention to provide a raised ridge in the bottom of long relatively narrow ice piece forming compartments of a resilient twistable ice tray intermediate continuously rounded end walls of the compartments which ridge serves a novel and two-fold purpose in the operation of shifting a portion of a selected elongated ice piece within a compartment laterally therebeyond into an upwardly tilted supported position at one end of the compartment for removal from the tray.

Further objects and advantages of the present invention will be apparent from the following description, reference being had to the accompanying drawings wherein a preferred embodiment of the present invention is clearly shown.

Figure 1:
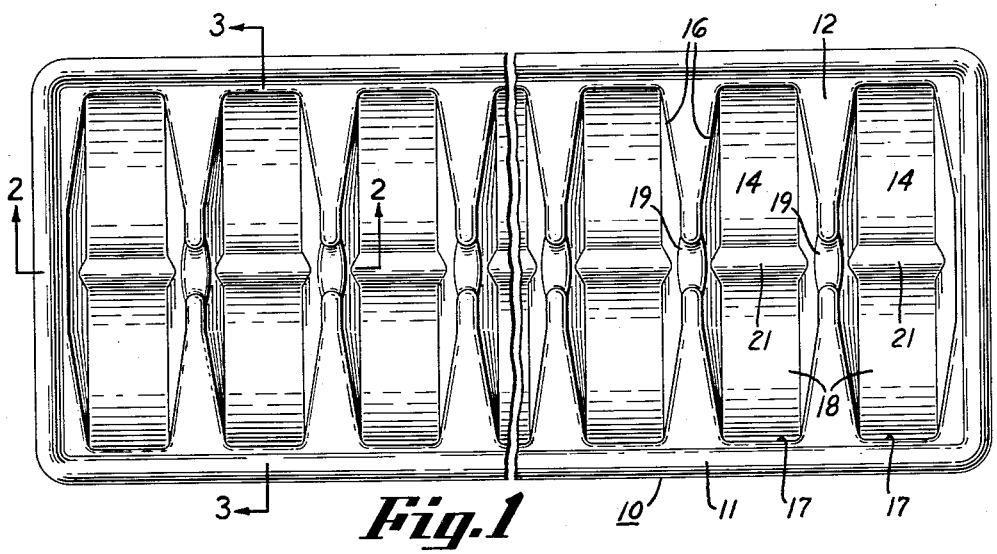
FIGURE 1 is a top plan view of a freezing device or ice tray structure having my invention embodied therein.
Figure 2:
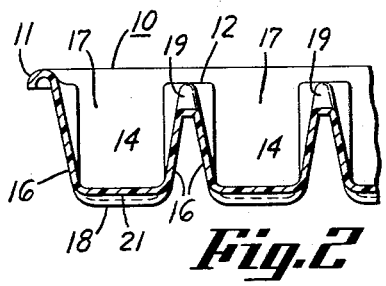
FIGURE 2 is an enlarged fragmentary vertical sectional view of the tray taken on the line 2—2 of FIGURE 1.
Figure 3:
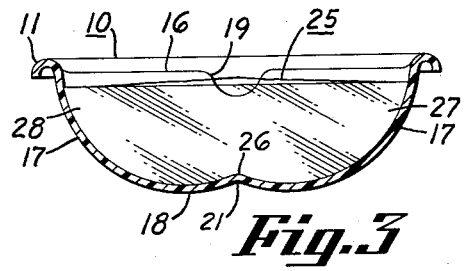
FIGURE 3 is an enlarged vertical sectional view taken on the line 3—3 of FIGURE 1 showing an ice piece frozen in a compartment of the tray.

Referring to the drawings, for illustrating my invention, I show in FIGURE 1 thereof a freezing device of the elongated tray type commonly used with household refrigerator cabinets for freezing water into ice pieces or blocks in open top compartments thereof. The entire tray generally represented by the reference numeral 10 is preferably, although not necessarily, formed of a high density linear polyethylene and is provided with an integral top somewhat rigidified bounding reinforcing rim 11. Surfaces of tray 10 are water repellent and the tray is flexible and resilient capable of being distorted or twisted within a normal range of resilience thereof. Tray 10 has a plurality of integral walls depending from a flat wall portion 12 thereof defining long relatively narrow open top pockets or compartments 14 therein for receiving water to be frozen into elongated ice pieces within a freezing chamber of a refrigerator cabinet. For example, walls 16 provide the long sides of compartments 14 (see FIGURE 2), walls 17 provide ends of the compartments (see FIGURE 3) and a wall 18 provides a flat bottom for the compartments. It is to be noted that the side walls 16 of tray 10 terminate a short distance below the rim 11 thereon and are provided with recessed channels 19 which form weirs between the compartments 14 for dispersing water incoming to the tray uniformly to the various compartments. The side walls 16 of compartments 14 diverge upwardly from the flat bottom wall 18 to the open top of the compartments and it will be noted (see FIGURE 1) that walls 16 are spaced apart a predetermined distance at the center of a long compartment 14 and converge toward one another into the end walls 17. Each of the end walls 17 of compartments 14 are curvilinear or continuously rounded from the bottom to the top thereof. In the present disclosure both the end walls 17 and the flat bottom walls are continuously curved throughout the length of a compartment 14 and an integral raised ridge 21 is provided in the bottom wall of a compartment. A ridge 21 extends transversely across a compartment 14 and forms the terminus of the curvilinear or rounded walls thereof. This raised ridge 21 is provided for a definite purpose in the present disclosure and serves to cooperate with the rounded compartment walls for creating a new and novel method of readying one or more selected elongated ice pieces frozen in compartments 14 for removal or harvest from tray 10. I show the long narrow ice freezing pockets or compartments 14 as extending transversely of tray 10 but these compartments may, insofar as my invention is concerned, be arranged in any fashion such, for example, in rows lengthwise of the elongated tray.

Figure 5:
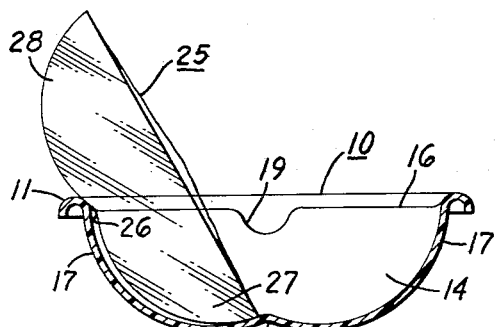
FIGURE 5 is a sectional view similar to FIGURES 3 and 4 showing the tilted ice piece slid lengthwise within its compartment with a portion thereof extending beyond one wall of the compartment and supported thereabove for removal from the tray.
Figure 4:
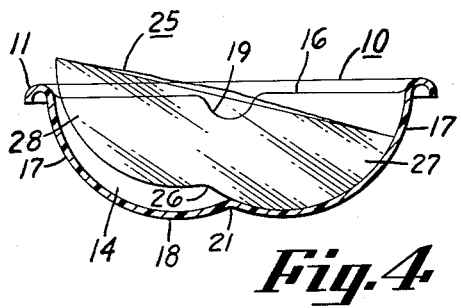
FIGURE 4 is a sectional view similar to FIGURE 3 showing a cammed tilted position of the ice piece in a compartment of the tray.

Assume that a few ice pieces are needed to chill salads or drinks in glasses, a freezing device or tray 10 with elongated ice pieces, indicated at 25 in the drawings, frozen in compartments 14 thereof is removed from a freezing chamber of a refrigerator cabinet. This removed tray 10 is maintained or held upright and is twisted longitudinally for shifting or distorting walls of compartments 14 with respect to one another to substantially peel them away from ice pieces therein which loosens the elongated ice pieces 25 from the compartment walls but retains the ice pieces in the compartments. The twisting of tray 10 also fractures a short ice stem between the spaced-apart ice blocks 25 and located in the weirs formed by channels 19. Tray 10 is, after twisting same, placed on a work ledge or table top and a downward force is applied directly to the top at one end of a selected elongated loosened ice piece 25 by a finger of the operator's hand. A feature of the present freezing device or tray having the raised ridge 21 formed in the central portion of the bottom wall of a compartment 14 is that a downward force may be applied to either end of an elongated ice piece 25 in the harvest thereof from tray 10. During application of this force to the ice piece a lower surface of the elongated ice piece 25 indicated at 26, adjacent ridge 21 bears on or against the one or first side of the raised ridge and causes the end, indicated at 27, of the ice piece to pivot or rotate in one end of compartment 14 about the curved walls 17 and 18 to cam or swing its other end, indicated at 28, upward away from the bottom, side and end walls 18, 16 and 17 respectively, out of the end of compartment 14 opposite the end thereof to which the downward force is applied to the elongated ice piece. The swinging of ice piece 25 shifts it into a tilted position within compartment 14 (see FIGURE 4) and continued application of force thereto substantially simultaneously slides the elongated ice piece lentghwise, to the left as viewed in FIGURE 4 of the drawings, along the long compartment to move a portion of the end 28 thereof over the opposite end of compartment 14 and horizontally therebeyond (see FIGURE 5). It will be noted that this sliding of the selected elongated ice piece 25 glides its one end 27 past the first side of ridge 21 into the opposite or left-hand end of compartment 14. Upon now releasing the force from the tilted slid elongated ice piece 25 it reversely slides back within compartment 14 and a part of end 27 thereof impinges on or becomes lodged against the second or left-hand side of ridge 21 with the portion of its other end 28 or bottom part 26, scored by the raised ridge, resting or lodged on the top surfaces of tray 10. The shifted or slid selected elongated ice piece 25 is thereby supported or held anchored at two spaced-apart points in a tilted position with its end 28 exposed above walls of compartment 14 accessible for removal from the tray. This manner of impinging an ice piece which is moved out of contact with walls of compartment 14 prevents the selected ice piece from sliding back into the compartment and it is therefore readied for removal from tray 10. As many selected elongated ice pieces 25 that may be desired for immediate use can be shifted and harvested from the tray in the fashion described. Other nonharvested ice pieces 25 of those remaining in compartments 14 of the tray may thereafter be replaced along with tray 10 into the freezing chamber until their removal and use is desired. The method of readying selected elongated ice pieces for removal from tray 10 is to be distinguished from methods or ice tray structures wherein an ice piece after having a portion thereof rotated outwardly of its compartment may slip back into the compartment and/or wherein a tray is, after loosening ice blocks from walls of their compartments, inverted to obtain a selected ice piece with the result that all ice pieces fall out of the tray and are wasted unless individually picked up and replaced in compartments thereof.

It should, from the foregoing, be apparent that I have in addition to making an improvement in the art also provided long narrow ice pieces the greater portion of which remain submerged within a glass and are therefore more effective to rapidly chill the drink. Due to the inclination of walls of ice compartments in the present freezing device or tray preloosened ice pieces move, when force is applied thereto, out of contact with the walls to relieve friction therebetween and this renders the act of harvesting ice pieces more feasible. My invention eliminates a waste of ice blocks or pieces usually accompanying the act of attempting removal of selected ones thereof from prior trays now on the market. By providing an arrangement whereby force may be applied directly to the top of either end of elongated ice pieces no special instructions are required for enabling a user of the tray to perform an ice piece harvesting operation. The present ice tray is simple in construction, of low cost to manufacture and the steps of readying selected ice pieces for harvest therefrom can be carried out with a minimum of effort on the part of a user of the tray.

While the embodiment of the present invention as herein disclosed constitutes a preferred form, it is to be understood that other forms might be adopted.

What is claimed is as follows:

1. A freezinng device for use in refrigerators comprising:
   (a) a tray having a plurality of integral walls forming the bottom, upstanding sides and ends of compartments therein for receiving water to be frozen into ice pieces,
   (b) said side walls extending from the bottom of said tray to a point adjacent the top of end walls of said compartments to be substantially coextensive in a direction upwardly therewith,
   (c) each end wall of said compartments being continuously rounded from the bottom of said tray to the top thereof,
   (d) ridge means including opposed sides raised from the bottom wall of each compartment intermediate ends thereof and terminated a substantial distance below the top of said substantially coextensive side and end walls of said compartments.
   (e) said ridge means projecting into the compartments with opposed sides thereof facing the inner surface of said rounded compartment end walls,
   (f) a selected ice piece in said tray being adapted to have a downward force applied directly to the top of one end thereof for rotating same within its compartment, for sliding the ice piece horizontally along the length of the compartment to glide said one end thereof over and past said raised ridge and for shifting a portion of the other end of said ice piece upwardly and laterally beyond the end of said compartment opposite its end to which force is applied to the ice piece into a tilted position therein, and
   (g) the side of said raised ridge means facing said opposite end of said compartment cooperating therewith to impinge said one end of the ice piece against the ridge means when the force is released from said shifted ice piece for anchoring same in said tilted position within the compartment with said portion of the other end of the ice piece exposed above walls of said compartment.

2. A freezing device as defined by claim 1 wherein the raised ridge means in the bottom wall of compartments of the tray is located centrally between the rounded end walls of said compartments whereby force may be applied to the top of either end of an ice piece to rotate and shift same therein.

3. A freezing device as defined by claim 1 wherein opposite side walls of each compartment in the tray diverge from bottom to top thereof a greater distance in the vicinity of the raised ridge than adjacent ends of a compartment to facilitate rotation and shifting of an ice piece therein.

4. A freezing device as defined by claim 1 wherein the bottom wall of each compartment in the tray is defined by a surface continuously curved on opposed sides of the raised ridge means therein to the rounded end walls of said compartment.

References Cited in the file of this patent

UNITED STATES PATENTS

| | | |
|---|---|---|
| 1,679,292 | Caney | July 31, 1928 |
| 1,717,857 | Spreen | June 18, 1929 |
| 1,868,070 | Newman | July 19, 1932 |
| 1,868,503 | Kennedy | July 26, 1932 |
| 1,889,481 | Kennedy | Nov. 29, 1932 |
| 2,145,719 | Geyer | Jan. 31, 1939 |
| 2,190,610 | Reeves | Feb. 13, 1940 |
| 2,772,542 | Gaugler | Dec. 4, 1956 |
| 2,890,122 | Katon | June 9, 1959 |
| 3,021,695 | Voightmann | Feb. 20, 1962 |

FOREIGN PATENTS

| | | |
|---|---|---|
| 329,849 | Great Britain | May 29, 1930 |